April 5, 1960 F. J. D. DAYONNET ET AL 2,932,016

APPARATUS FOR SIMULTANEOUS READING OF A PLURALITY OF CURVES

Filed Dec. 20, 1955 3 Sheets-Sheet 1

Inventors:
François Jacques Denis Dayonnet and
Paul François Marie Gloess
by

Inventors:
Francois Jacques Denis Dayonnet
and Paul Francois Marie Gloess
By [illegible] agt

APPARATUS FOR SIMULTANEOUS READING OF A PLURALITY OF CURVES

Filed Dec. 20, 1955 3 Sheets-Sheet 3

Inventors:
François Jacques Denis Dayonnet and
Paul François Marie Glaess
By [signature] agt

United States Patent Office 2,932,016

Patented Apr. 5, 1960

2,932,016

APPARATUS FOR SIMULTANEOUS READING OF A PLURALITY OF CURVES

François Jacques Denis Dayonnet and Paul François Marie Gloess, Paris, France

Application December 20, 1955, Serial No. 554,357

Claims priority, application France December 24, 1954

7 Claims. (Cl. 340—345)

The present invention relates to apparatus for simultaneously reading several curves, operating according to the technique of pulse transmission systems.

In certain scientific research work, industrial tests and experimental controls, and special techniques such as stereophonic sound reproduction, physiological techniques, etc., it is often required to investigate, control or reproduce, in view of certain purposes, the simultaneous behaviour of various quantities representative of phenomena occurring, at the same instant, in an operating apparatus or in any other working arrangement.

If all these quantities are functions of the same variable, it is possible to convert the variations thereof into curves recorded on various parallel tracks on the same support or base-carrier. Such curves may, for instance, be drawn or recorded with a stylus on paper tape. When the system the variations of which must be recorded, presents substantially slow movements, as in physiological or mechanical experiments, a mirror arrangement is generally used, which is mechanically connected to said movements, pencils of light being then directed onto a paper tape coated with a light sensitive emulsion, said tape unwinding with a uniform motion. On the other hand, if all the quantities of the phenomena involved can be converted, by suitable means, into electric voltages U, varying with the time $t$, it is well known that photographic arrangements may be used for simultaneously recording the curves $U=f(t)$ on a cinematographic film or on a photographic paper tape; it is this process which is supposed to be made use of in the following specification, in view of facilitating the understanding of the invention.

All the recordings or drawings, when obtained, must then be analysed in a special apparatus known as a curve reading device. Said reading device comprises as many outputs as there are curves to be scanned, and reproduces, in the shape of electric voltages $U=f(t)$, the amplitudes of the curves recorded on the tape or which is caused to progress in front thereof.

It is obvious, in order to read simultaneously a certain number $n$ of curves, to use an apparatus with $n$ reading devices, each device analyzing one curve; it is however readily seen that such an apparatus is unpractical from all points of view: cost, price, bulk, difficulty of adjustment, etc.

It is an object of the present invention to provide a reading device adapted for simultaneously analyzing $n$ curves, inscribed side by side on the same support which may be, as mentioned hereinabove, a paper tape, a cinematographic film, of normalized width: 35 or 16 mm., or a photographic paper tape.

According to the invention, the recorded curves are plotted in ordinary cartesian co-ordinates, each of these curves being associated with a time axis. In other words, the recording presents $n$ parallel lines, uniformly spaced apart, between which are lodged the $n$ curves. It is obvious that the distance between any point of a given curve and the corresponding time axis thereof represents the ordinate or amplitude of said curve at that point.

The support progresses with a preferably constant speed and is transversely scanned during its movement by a pin-hole spot of light in rapid movement. The beam of light emitted by the spot of the cathode tube is focussed on the support by means of an optical system. Every time that the light spot crosses, on the film, the time axis or a recorded curve, a beam of light is collected by reflection or transmission on a highly sensitive photoelectric cell.

At the output of the cell, short electric pulses are then generated, leading to a succession of recurrent trains in the following order after the beginning of scanning: pulse relative to the first curve, pulse relative to first axis, pulse relative to second pulse, pulse relative to second axis . . . pulse relative to $n$th curve, pulse relative to $n$th axis and so on. The pulses relating to the curves are modulated according to the type of modulation known as "pulse time modulation" or "pulse position modulation," and the pulses relating to the axes are unmodulated, i.e. present fixed positions in each scanning cycle. The pulse trains obtained are then amplified and clipped or sliced.

An electric selecting device to be described later, is mounted at the output of the clipper. Said selector comprises as many pairs of output terminals as there are recorded curves. At the output corresponding to a given curve, are collected duration modulated pulses which carry all data relating to said curve; these pulses start at the same time as the short pulses relating to said curve and finish with the short pulses relating to the time axis of said curve. The duration modulated pulses are demodulated by means of low pass filters. Such a demodulation method is described on pages 276–277 "Modulation theory" (Bell Telephone Laboratories Series) by Harold F. Black.

The position modulated pulse trains are similar to those found in the pulse transmission multiplex systems using said modulation. The selecting device operates both as a converter from position modulation to duration modulation and, at the same time, as a channel separator. In the known position modulated multiplex systems, the portion of the recurrent cycle assigned to a given channel is determined by "gating pulses" or "selecting pulses" derived from a delay line fed by synchronizing pulses; these gating pulses open the considered channel to the position modulated pulses carrying the information. On the contrary, in the present case, the limits of the portions of the recurrence cycle, which is nothing else than the scanning cycle are marked by the short pulses corresponding to the time axes and the selecting device, which is of the binary counter type, and which converts the position modulation into duration modulation and switches the signals corresponding to the various curves onto different outputs.

The invention will be more fully understood with the aid of the following description and with reference to the appended drawing, in which same reference numbers designate identical elements. In the drawing.

Figure 1:
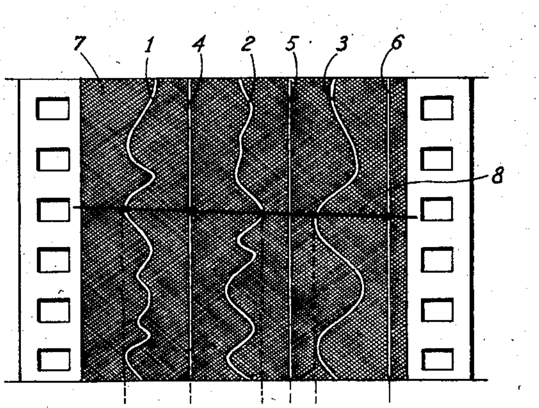
Fig. 1 shows a cinematographic film, and three curves and three axes recorded thereon.

Referring to Fig. 1, curves 1, 2 and 3 are traced in transparent lines on an opaque cinematographic film or support 7. The corresponding axes of abscissae, 4, 5, 6, respectively, are also traced in transparent lines on the film.

Figure 2:
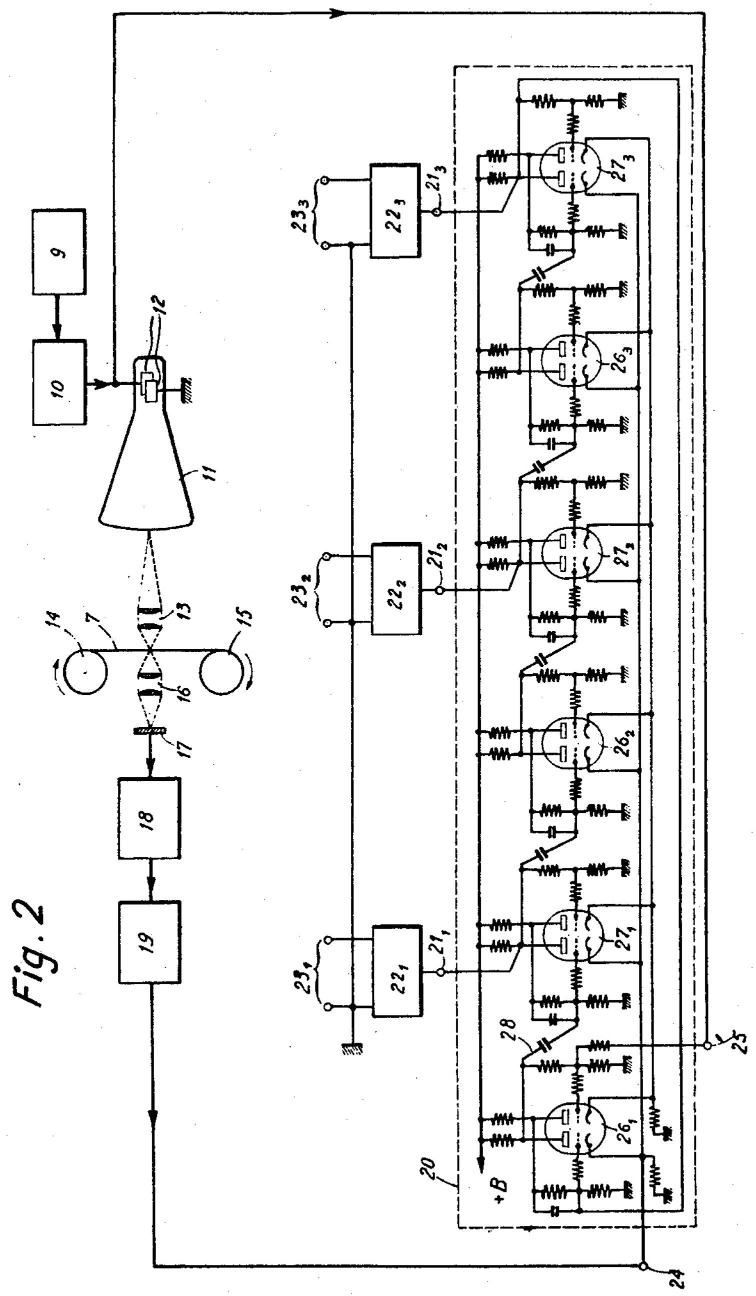
Fig. 2 is a diagrammatical view of a recording apparatus according to the invention.

In Fig. 2, 9 is a pulse generator, the output of which is connected to a saw-tooth wave generator 10, and 11 a cathode-ray tube of the so-called "flying spot" type. The saw-tooth waves delivered by generator 10 are applied to the plates of horizontal deflection 12 of the cathode-ray tube 11.

A lens 13 focuses the moving spot of light of tube 11 on film 7. The film 7 is driven in a vertical direction, preferably at constant speed, from a first reel 14 to a second reel 15. The light transmitted by transparent portions of the film 7 is focused by a lens 16 on the sensitive surface of a photoelectric cell 17, the electric output of which is connected to the input of an amplifier 18 connected in series with a slicing and pulse shaping circuit 19 and a selecting device 20. This device is of the counter type and comprises a first input terminal 24 connected to the output of the circuit 19; a second input terminal 25 connected to the output of generator 10, and three output terminals $21_1$, $21_2$, $21_3$, in the non limitating example now being described. These output terminals are connected to low pass filters $22_1$, $22_2$, $22_3$ respectively. The moving spot of tube 11 scans film 7, with a scanning frequency equal to the recurrent frequency of the pulses produced by the pulse generator 9, the scanning line 8 on the film being preferably horizontal. When the scanning line 8 (Fig. 1) crosses the curves 1, 2, 3 and the axes 4, 5, 6, short light pulses are transmitted to the photocell 17, and converted into negative short electric pulses $33_1$, $33_2$, $33_3$ and $34_1$, $34_2$, $34_3$, respectively (see portion (*a*) of Fig. 4) which are transmitted to the input terminal 24. Pulses $34_1$, $34_2$, $34_3$ have a constant period of recurrence, whereas pulses $33_1$, $33_2$, $33_3$, are position modulated.

The selecting device 20 is adapted to convert all these short pulses into duration modulated pulses $35_1$, $35_2$, $35_3$ (Fig. 4), appearing at the respective outputs $21_1$, $21_2$, $21_3$.

The selecting device 20 may either consist of an "N-stage parallel-coupled binary counter" or of an "N-stage series-coupled binary counter." These two types of counters are well known in the art, and both comprise bistable multivibrators connected in parallel in the case of said first binary counter and in series in the case of said second binary counter. Counters having N stages in parallel are, for instance, described by T. K. Sharpless "High Speed N-Scale Counters," Electronics, March 1948, pp. 122 to 125, and series binary counters are, for instance described by I. E. Grosdoff, "Electronics Counters," R.C.A. Review, September 1946, pp. 438 to 447.

In Fig. 2 there is shown a three-stage counter, comprising six bistable multivibrators $26_1$, $27_1$, $26_2$, $27_2$, $26_3$, $27_3$. The twin-triode tube of each multivibrator may be considered as built up from a right-side triode and a left-side triode, enclosed in a common evacuated envelope. The cathodes of the left-side triodes are parallel connected to terminal 24, thus forming the input circuit of the arrangement. The anodes of the left-side triodes of the alternate tubes $27_1$, $27_2$, $27_3$ are respectively connected to the output terminals $21_1$, $21_2$, $21_3$.

The operation of such arrangement is well known: Each bistable multivibrator has an "operating position" (in which its right-side triode is conducting, and its left-side triode non-conducting) and a "non-operating position" (in which its right-side triode is non-conducting, and its left-side triode is conducting). Assume that all the multivibrators are in their non operating position, except for $26_1$, which is in its operating position, the application of the negative pulse $33_1$ to the cathode of the non-conducting triode of multivibrator $26_1$ trips it into non-operating position, while the other multivibrators remain unchanged. A negative pulse is simultaneously applied, by means of connection 28, to the grid of the left-side triode of multivibrator $27_1$, which is tripped into operating position. Multivibrator $27_1$ is tripped back into non-operating position at the instant of reception of the negative pulse $34_1$. Finally, pulse $35_1$ is collected on output terminal $21_1$, pulse $35_2$ on output terminal $21_2$ and pulse $35_3$ on output terminal $21_3$. Pulses $35_1$ to $35_3$ are duration modulated and, in the example now being described, they are demodulated by low pass filters $22_1$ to $22_3$, respectively, so that voltages obtained at terminals $23_1$, $23_2$ and $23_3$ are proportional to the ordinates of curves 1, 2 and 3, respectively. It will be understood that pulses $35_1$, $35_2$ and $35_3$, according to the use to be made of the respective ordinates of curves 1, 2 and 3, to which they correspond, may be applied to other devices than filters $22_1$, $22_2$ and $22_3$.

Figure 3:
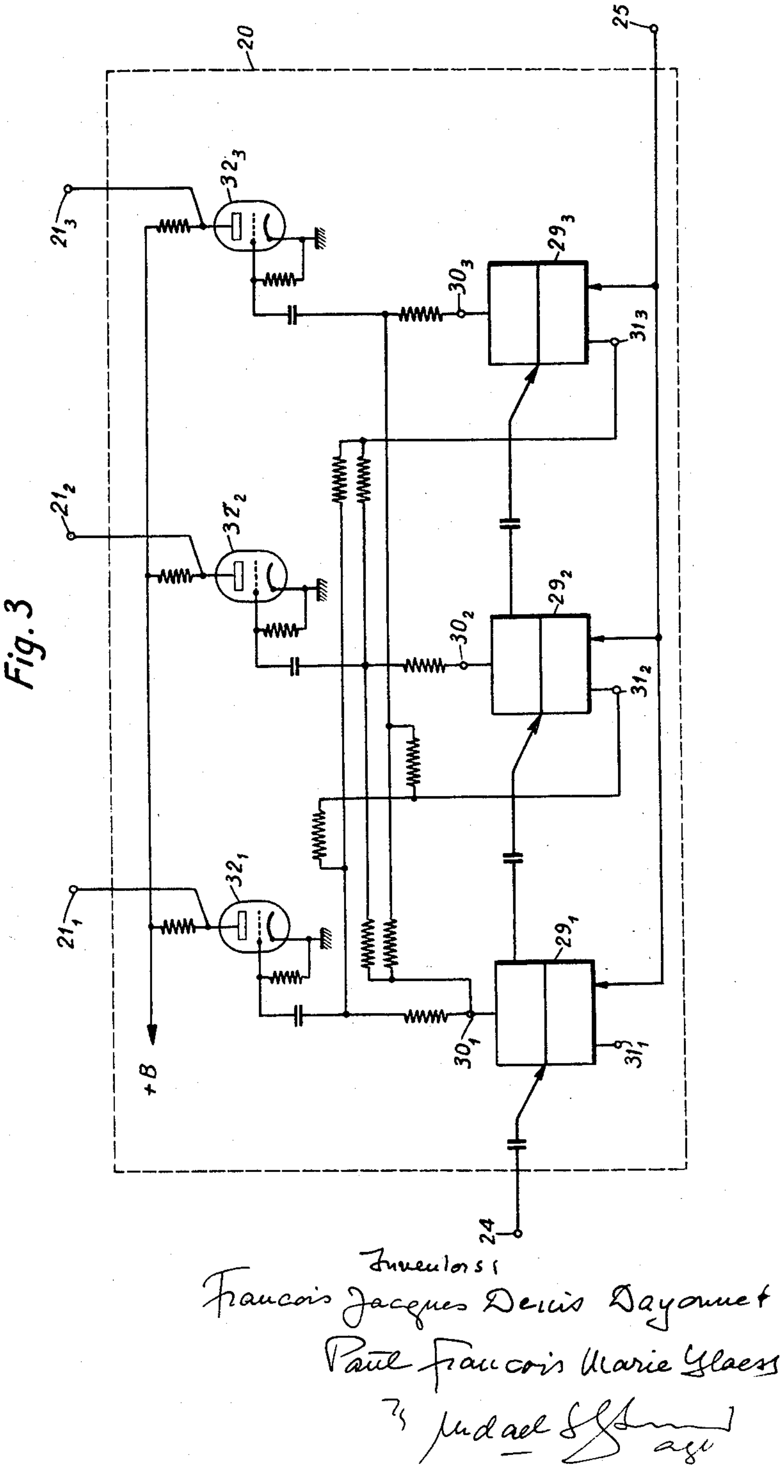
Fig. 3 shows a modification of the selecting device 20 of the recording apparatus of Fig. 1.

Fig. 3 represents a series-coupled binary counter which comprises the bistable multivibrators $29_1$, $29_2$, $29_3$, connected in cascade. The short pulses $33_1$, $34_1$, $33_2$, $34_2$, $33_3$, $34_3$, are applied to the input terminal 24 of the multivibrator $29_1$. Each multivibrator comprises two outputs $30_1$—$31_1$, $30_2$—$31_2$, $30_3$—$31_3$, respectively, and the signals at the outputs of any one of the multivibrators are in phase opposition; output $31_1$ is not used.

As a result from the well known operation of the bistable multivibrators herein considered, pulses $36_1$, $36_2$, $36_3$ (see portion *b* of Fig. 4) are collected respectively on outputs $30_1$, $30_2$, $30_3$, and pulses $37_2$, $37_3$, respectively on outputs $31_2$, $31_3$.

Figure 4:
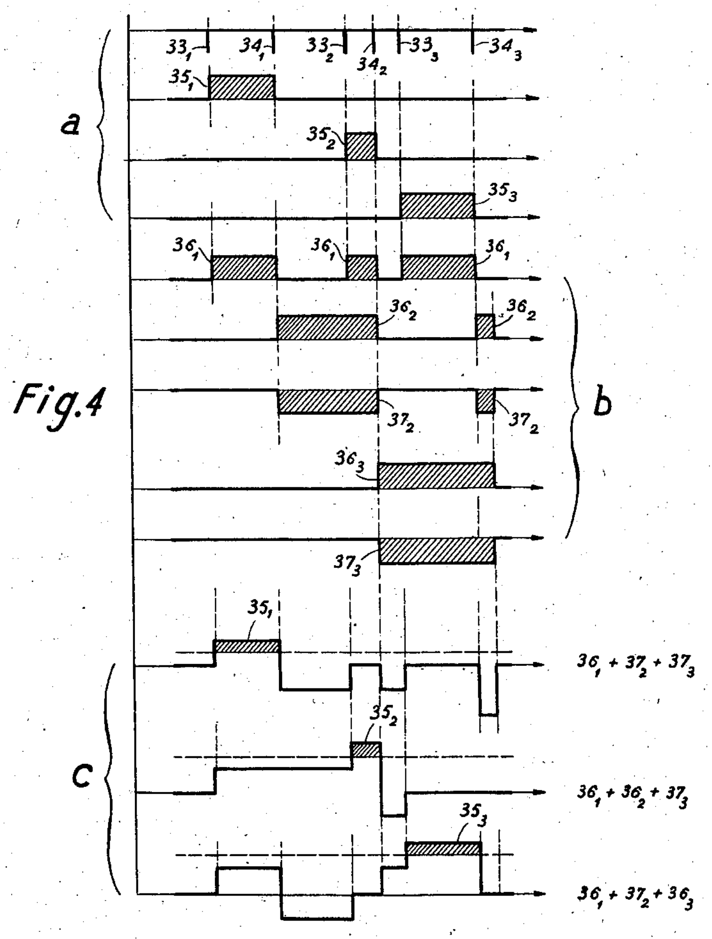
Fig. 4 is a diagram showing the respective wave-shapes of the signals taken at various points of the circuits of Figs. 2 and 3.

Pulses $36_1$, $37_2$, $37_3$ are mixed in the circuits and their sum is applied to the control grid of the peak riding clipping tube $32_1$, which delivers a pulse $35_1$ at terminal $21_1$ (see portion *c* of Fig. 4). In the same way, the clipping tube $32_2$ will be conducting only during the peaks of the sum of pulses $36_1$, $36_2$ and $37_3$, and will deliver pulses $35_2$ at terminal $21_2$; clipping tube $32_3$ will be conducting only during the peaks of the sum of pulses $36_1$, $37_2$, $36_3$, and will deliver pulses $35_3$ at terminal $21_3$.

In the case of Figs. 2 and 3, resetting of the counters into their initial state, before the scanning of each line, is performed by a pulse derived from the generator 10 and applied at input 25 of the selecting device.

Although the present invention has been described in relation to a particular embodiment thereof, it will be understood that several modifications may be devised by those skilled in the art without departing from the spirit of the invention. It will be particularly noted that it is not necessary to provide a uniform speed of motion of the support in a direction at right angles with the scanning line; for instance in some applications, said speed may be varied according to a predetermined law; in other applications, the support may be stopped for short times at certain positions, so that the curve ordinates may be examined at leisure in said positions. It will also be noted that the axes of abscissae are not necessarily rectilinear: in certain applications, there may be substituted, to each rectilinear axis and its associated curve, a pair of associated curves whose intersections with the scanning line determine the duration of the corresponding duration modulated pulse.

Moreover, the cinematographic film instead of being scanned by means of a flying spot system, may be scanned by means of any other arrangement, for instance, an arrangement comprising an opaque disc provided with a plurality of small peripheric holes and rotating in front of a source of light, so that a moving filiform beam of light is repeatedly transmitted through each of the successive holes.

Instead of illuminating the support with a moving spot of light, the successively illuminated portions being viewed with a photo-cell, it is possible to produce an image of said support and of the curves and axes recorded thereon, onto the mosaic of an iconoscope, the above mentioned "scanning line" being then the trace of the electron beam of the iconoscope on its mosaic. As a non-limitative numerical example, it will be further mentioned that in a particular embodiment of the invention there has been used a scanning device operating at a frequency of 300 c./s., the film moving at a uniform speed of 1 mm./sec.; but of course, in other applications, the scanning device could be operated at far higher frequencies, for instance at 100 kc./sec.

We claim:

1. An apparatus for obtaining, from a plurality of curves recorded on a common support, separate trains of duration modulated electric pulses, said trains respectively corresponding to said curves, and the duration of the pulses of each train being representative of the ordinates of the curve corresponding to this train; in which said support is provided with a plurality of recorded axes in number equal to the number of said curves, each axis being associated with a curve; and which comprises: a scanning device for scanning said support along a scanning line crossing said curves and said axes, said scanning device being adapted to produce short electric pulses generated each time the scanning line crosses the curves and axes, said short electric pulses thus constituting a succession of recurrent trains of pulses respectively generated by said curves, said scanning device having an output, a selector device of the counter type having an input connected to the output of the scanning device, means for converting every two pulses following each other at said input into a duration modulated pulse, having a duration equal to the time interval separating said two pulses, as many outputs as there are curves recorded on said common support, and means for respectively switching the successive duration modulated pulses to said outputs.

2. An apparatus according to claim 1, wherein the selecting device is substantially constituted by a binary counter of the parallel type.

3. An apparatus according to claim 1, wherein the selecting device is substantially constituted by a binary counter of the series type.

4. An apparatus according to claim 1, comprising synchronizing means to ascertain the synchronization of the duration modulated pulse trains with the scanning of the respective curves and axes, said synchronizing means directly connecting the scanning device to the selecting device.

5. An apparatus according to claim 1, in which said scanning device comprises: a flying spot cathode-ray tube producing a filiform scanning beam for scanning said support, a saw-tooth wave generator for controlling said scanning beam, a photo-cell adapted to receive the light of said scanning beam transmitted by said support, said photo-cell producing said short electric pulses, and means for connecting said photo-cell to the input of said selector device.

6. An apparatus according, to claim 5, in which the saw-tooth wave generator is directly connected to the selector device.

7. An apparatus according to claim 1, further comprising individual means separately connected at the outputs of said selector device, for demodulating said trains of duration modulation pulses, said individual means comprising low-pass filters.

References Cited in the file of this patent

UNITED STATES PATENTS

| | | |
|---|---|---|
| 2,110,746 | Tolson | Mar. 8, 1938 |
| 2,148,954 | Methlin | Feb. 28, 1939 |
| 2,412,467 | Morton | Dec. 10, 1946 |
| 2,463,534 | Hawkins | Mar. 8, 1949 |
| 2,504,999 | McWhirter | Apr. 25, 1950 |
| 2,616,983 | Sworykin | Nov. 4, 1952 |
| 2,656,101 | Haviland | Oct. 20, 1953 |
| 2,705,901 | Sherwin | Apr. 12, 1955 |

OTHER REFERENCES

Modulation Theory, Bell Tel. Lab. Series, 1953.